United States Patent [19]

Williams

[11] 4,332,415
[45] Jun. 1, 1982

[54] OPEN CART ROOF STRUCTURE

[76] Inventor: Thomas P. Williams, Apt. 703, Regency House, 435 S. Gulfstream Ave., Sarasota, Fla. 33577

[21] Appl. No.: 950,836

[22] Filed: Oct. 12, 1978

[51] Int. Cl.³ .............................................. B60J 7/02
[52] U.S. Cl. ................................ 296/213; 280/DIG. 5
[58] Field of Search .................... 296/137 R, 156–178, 296/78.1, 213; 180/65 R; 52/16; 280/DIG. 5

[56] References Cited

U.S. PATENT DOCUMENTS

| 3,050,335 | 8/1962 | Schubach | 296/213 |
|---|---|---|---|
| 3,605,350 | 9/1971 | Bowers | 52/16 |
| 3,908,777 | 9/1975 | Davidson | 280/DIG. 5 X |
| 3,981,107 | 9/1976 | Schubach | 296/137 R X |
| 4,013,315 | 3/1977 | West | 280/DIG. 5 X |
| 4,098,536 | 7/1978 | Mills | 280/DIG. 5 X |
| 4,100,703 | 7/1978 | Sickler | 52/16 |

FOREIGN PATENT DOCUMENTS 608153  9/1960  Italy ................................ 296/137 R Primary Examiner—Joseph F. Peters, Jr.
Assistant Examiner—Norman L. Stack, Jr.
Attorney, Agent, or Firm—Frijouf, Rust & Pyle

[57] ABSTRACT

An improved cover for a golf cart is disclosed with a roof structure supported on the golf cart by a plurality of upstanding support members. A gutter extends about the periphery of the roof to collect water flowing from the roof structure. A conduit is connected to the gutter to extend along one of the upstanding supports for draining the collected water from the gutter to the ground. The invention may incorporate an integral roof and gutter structure included with new golf carts. The invention may also be an accessory device for attachment to a roof structure on an existing golf cart.

2 Claims, 8 Drawing Figures

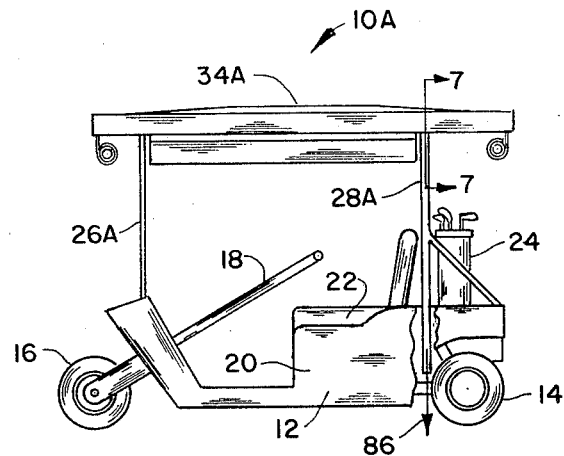
FIG. 6
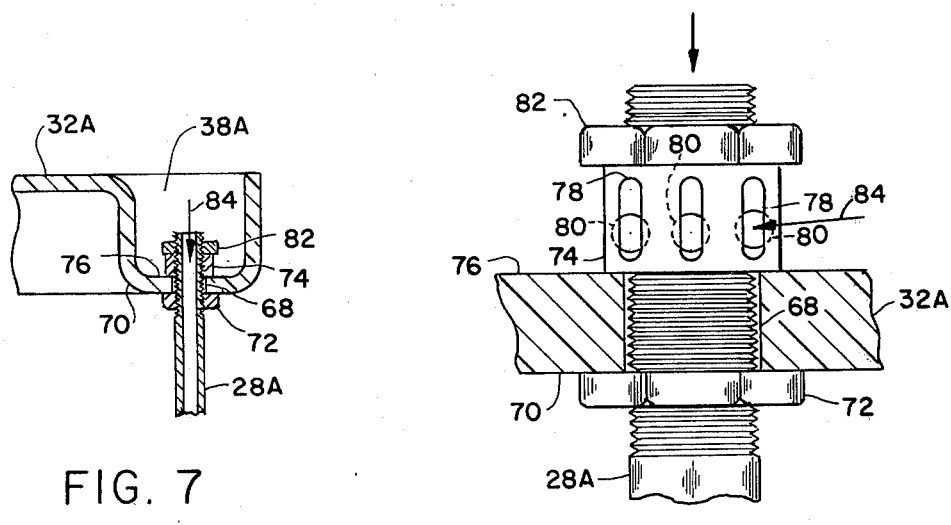
FIG. 7
FIG. 8

OPEN CART ROOF STRUCTURE

BACKGROUND OF THE INVENTION

1. Field of the Invention

This invention relates to roof structures and gutters and more particularly to a roof structure having a gutter for an open vehicle such as a golf cart or the like.

2. Description of the Prior Art

Motorized carts and vehicles began with open cart velocipedes and soon developed to include roofs and side curtains. With the advent of full body automobiles and the like, gutters were incorporated on the vehicles to prevent the water draining off the roof from impairing the vision on the glass of the vehicle. In general, the gutters extended along the sides of the vehicle to an open trailing edge which allowed the collected water to drain along the back portion of the body of the vehicle. A similar gutter arrangement exists on most automobiles presently being manufactured.

A distinct but related art also developed in small motorized carts such as golf carts and the like. Many golf carts have a roof structure for moderate protection from sun and rain. Unfortunately, these roof structures are designed only for marginal protection to enable a golfer to retreat to a permanent shelter on the golf course. One plausible explanation for the absence of gutters on open cart vehicles is the difficulty of draining the collected water from the gutters in a controlled manner without draining on the occupants of the cart.

Therefore, it is an object of this invention to provide an apparatus which overcomes the aformentioned inadequacies of the prior art devices and provides an improvement which is a significant contribution to the advancement of the motorized cart art.

Another object of this invention is to provide an improved cover for a golf cart comprising a roof structure and a gutter extending about the periphery of the roof structure with a conduit connected to the gutter and extending along an upstanding support for the roof structure for draining the collected water from the gutter to the ground.

Another object of this invention is to provide an improved cover for a golf cart wherein the conduit may comprise one of the upstanding supports being a tubular configuration for draining the collected water therethrough.

Another object of this invention is to provide an improved roof structure for a golf cart which takes the form of an attachment device for the golf cart cover wherein gutter means may be attached to the existing roof structure by mechanical fasteners or the like.

Another object of this invention is to provide an improved cover for a golf cart incorporating a flexible conduit connected to the gutter and clamped to one of the upstanding support members enabling draining of the collected water from the gutter to the ground.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims to cover the disclosed embodiments shown in the attached drawings and the equivalent thereof as set forth in the detailed discussion. For the purpose of summarizing the invention, the invention may be incorporated into an improved cover for a golf cart comprising a roof structure supported relative to the golf cart by a plurality of upstanding support members. Gutter means extend about the periphery of the roof structure to collect water flowing therefrom. A conduit is connected to the gutter means and extends along one of the upstanding supports for draining the collected water from the gutter means to the ground.

The invention may also be incorporated into an attachment device for a roof structure secured to a golf cart by a plurality of upstanding support members. In this embodiment, the invention comprises gutter means mounted about the periphery of the existing roof structure to collect water flowing therefrom. A flexible conduit is connected to the gutter means. Retention means, such as clamps or tape, secure the flexible conduit to one of the upstanding supports to route the flexible conduit into proximity to the ground enabling the water to drain therethrough.

In more specific embodiments of the invention, the roof structure is preferably sloped downward from the front and center of the roof to the back and peripheral edges enabling drainage of water therefrom. In one embodiment, the conduit includes a fitting extending through the wall of the gutter with a tubing secured to the fitting for draining the collected water. The fitting is preferably located on the rear edge of the roof structure thereby facilitating draining of the collected water upon forward acceleration of the golf cart. The conduit means may comprise a first and a second conduit located on opposed ends of the rear edge of the roof structure.

In one embodiment, the gutter means is an integral part of the roof structure and may be integrally molded therein. In this embodiment, the upstanding supports have a tubular configuration to serve as the conduits for draining the collected water therethrough. The upstanding supports extend through the bottom surface of the gutter means. In the alternative, the gutter means may be an attachment device or an existing roof structure and secured thereto by mechanical fasteners such as screws, rivets, or the like. The mechanical fasteners preferably extend through vertical surfaces in the roof structure.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 6 is a side elevational view of a golf cart including a second embodiment of the invention;

FIG. 7 is an enlarged sectional view along line 7—7 of FIG. 6; and

FIG. 8 is a magnified view partially in section of FIG. 7.

Figure 1:
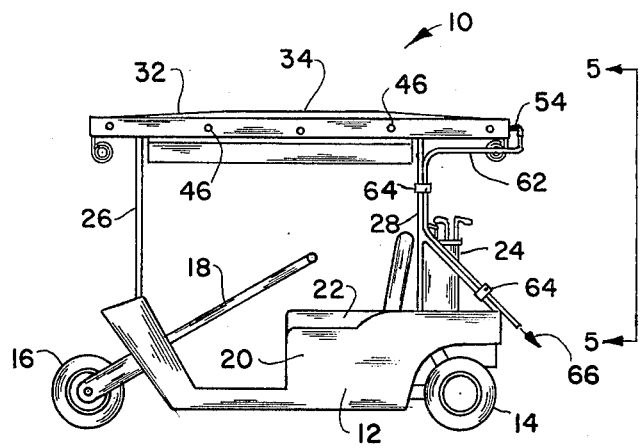
FIG. 1 is an elevational view of a golf cart including the improved roof cover.

Similar reference characters refer to similar parts throughout the several views of the drawings. For a more clearer understanding of the invention, the following number identifications, taken in connection with the detailed description and the drawings set forth the preferred mode or practice of the invention:

| 10 | cover | 43 | gutter wall |
|---|---|---|---|
| 10A | cover | 44 | gutter wall |
| 12 | golf cart | 46 | mechanical fastener |
| 14 | drive wheels | 48 | aperture |
| 16 | front wheel | 50 | aperture |
| 18 | control arm | 52 | sealer |
| 20 | body | 54 | fitting |
| 22 | seat | 56 | aperture |
| 24 | bags | 58 | flange |
| 26 | upstanding support member | 60 | nut |
| 26A | upstanding support member | 62 | flexible tubing |
| 28 | upstanding support member | 64 | clamps |
| 28A | upstanding support member | 66 | arrow |
| 30 | upstanding support member | 68 | aperture |
| 32 | roof structure | 70 | bottom |
| 33 | adhesive | 72 | nut |
| 32A | roof structure | 74 | spacer |
| 34 | center | 76 | upper surface |
| 34A | center | 78 | slots |
| 36 | top region | 80 | aperture |
| 38 | recess | 82 | nut |
| 38A | gutter | 84 | arrow |
| 40 | vertical terminating edge | 86 | arrow |
| 41 | gutter wall | | |
| 42 | gutter wall | | |

DETAILED DESCRIPTION

FIG. 1 is a side elevational view of an improved cover 10 for an open cart 12 shown as a golf cart having drive wheels 14 and a front wheel 16 which is controlled by a control arm 18. The golf cart 12 has a golf cart body 20 which supports a seat 22 and golf club bags 24.

Figure 5:
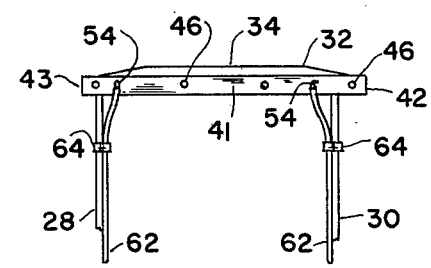
FIG. 5 is a partial elevational view along line 5—5 of FIG. 1.

The golf cart 12 includes a single forward upstanding support member 26 and plural rear support members 28 and 30 shown more fully in FIG. 5. The upstanding support members 26, 28 and 30 support a roof 32 which slopes from the center 34 to the outer peripheral edge of the roof 32.

Figure 2:
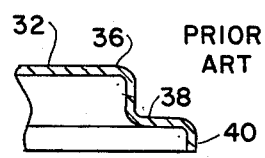
FIG. 2 is a magnified sectional view of a prior art roof structure.

FIG. 2 is a side sectional view of the prior art roof structure 32 having a top region 36, a recess 38 and a vertical terminating edge 40. This prior art roof structure 32 is typically made of a fiberglass, a plastic material, cloth or the like.

Figure 3:
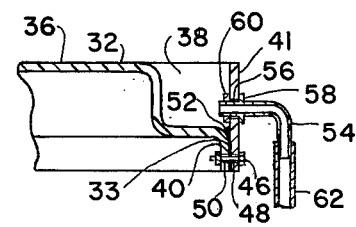
FIG. 3 is an enlarged sectional view along line 3—3 in FIG. 4.
Figure 4:
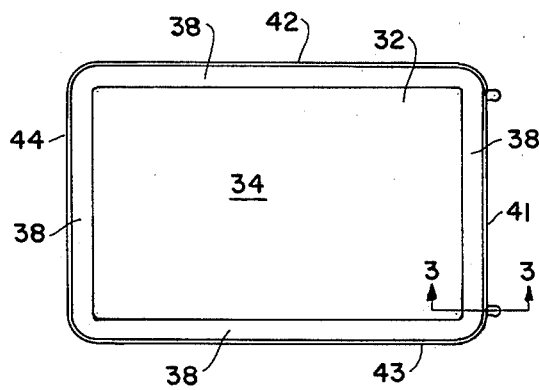
FIG. 4 is a plan view of the roof cover shown in FIG. 1.

FIGS. 3–5 illustrate the improved roof structure 32 comprising first through fourth gutter walls 41–44 which may be a single unit extending about the perimeter of the roof 32 or may be four distinct elements. Each of the gutter walls 41–44 is secured in a similar manner which is exemplified in FIG. 3. A mechanical fastener 46, such as a nut and bolt, rivet or the like, extends through an aperture 48 in the gutter wall 41 and an aperture 50 in the vertical terminating edge 40 of the roof structure 32. Adhesive 33 may also be used in lieu of mechanical fasteners to secure the gutter walls 41–44 to the roof 32. The gutter wall 41 and recess 38 form the gutter with the intersections being sealed by a suitable sealing material 52. A fitting 54 shown having a right angle bend extends through an aperture 56 in the gutter wall 41 with a flange 58 of fitting 54 abutting the outside surface of the gutter wall 41. A locking fastener 60 such as a nut secures the position fitting 54 relative to the first gutter wall 41. The fitting 54 is mounted low within the recess 38 to enable proper draining of collected water therein. A flexible tubing 62 is connected to the fitting 54 and extends downwardly as shown in FIGS. 1 and 5 along the upstanding support members 28 and 30. The tube 62 is secured to upstanding supports 28 and 30 by clamps 64. The flexible tubing 62 terminates at the rear portion of the cart 12 to enable draining of the collected water from the gutter as indicated by the arrow 66. In this embodiment, plural fittings 54 are incorporated at opposed sides of the rear gutter wall 41. Forward acceleration of the golf cart 12 facilitates drainage of water within the gutter through flexible tubing 62.

FIG. 6 is a side elevational view of a second embodiment of a cover 10A installed on golf cart 12. In this embodiment, the golf cart 12 has a front upstanding member 26A and plural rear upstanding members as in FIG. 5 but only one 28A being shown in FIG. 6. FIGS. 7 and 8 illustrate magnified views of this embodiment of the invention. The roof structure 32A comprises an integral roof and recess 38A forming a gutter which extends about the perimeter of the roof structure 32A in a manner similar to that shown in FIG. 4. The upstanding wall 28A is a tubular member extending through an aperture 68 in the bottom 70 of the gutter. Upstanding support member 28A has a threaded upper region for receiving a nut engageable with the bottom surface 70 of the roof structure 32A. A spacer 74 is positioned to engage the upper surface 76 of the roof strucutre 32A. The spacer 74 has a plurality of slots 78 enabling water to flow into apertures 80 formed in the upstanding support member 28A. A nut 82 secures the upstanding support 28A to the roof structure 32A. Slots 78 in the spacer 74 in cooperation with apertures 80 in the upstanding support member 28A enables the water collected in the gutter to enter support member 28A as indicated by the arrows 84 to flow downwardly and exit on the bottom region of upstanding support member 28A as indicated by the arrow 86. It should be appreciated that the remaining rear upstanding member (not shown) may have a similar configuration. Those skilled in the art will appreciate that the two embodiments presented in this specification may be interchanged or combined without modifying or varying from the subject invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:

The invention claimed is:

1. An improved cover for a motorized golf cart, comprising in combination:
   a dome-shaped roof structure contoured to drain water away from the central area of said dome-shaped roof structure to the periphery thereof;
   said dome-shaped roof structure including a recess fromed integrally with said dome-shaped roof structure and extending about the entire periphery of said dome-shaped roof structure for collecting water flowing from said central area of said dome-shaped roof structure;
   a gutter wall connected to said recess about the entire periphery of said dome-shaped roof structure;
   the bottom of said recess being positioned lower than the lowermost portion of the contour of said dome-shaped roof structure enabling the runofff water to collect in said recess;
   a plurality of upstanding members connected to said motorized golf cart for supporting said dome-shaped roof structure over said motorized golf cart;
   a drain including a conduit means;
   means for connecting said conduit means to the portion of said gutter wall disposed about the rear area of said roof structure with respect to the direction of travel of said motorized golf cart; and
   said conduit means being disposed along one of said upstanding members.

2. An improved cover for a motorized golf cart, comprising in combination:
   a dome-shaped roof structure;
   said roof structure including a recess formed integrally with said dome-shaped roof structure and extending about the entire periphery of said dome-shaped roof structure for collecting water flowing from said dome-shaped roof structure;
   a gutter wall connected to said recess about the entire periphery of said dome-shaped roof structure;
   the bottom of said recess being positioned lower than the lowermost portion of the contour of said dome-shaped roof structure enabling the runoff water to collect in said recess;
   a plurality of upstanding members connected to said motorized golf cart for supporting said dome-shaped roof structure over said motorized golf cart;
   one of said upstanding members supporting the rear area of said dome-shaped roof structure with respect to the direction of travel of said motorized golf cart comprising a fluid conduit; and
   means for connecting said fluid conduit to said recess enabling the water collected in said recess to drain through said fluid conduit.

* * * * *